United States Patent
Bellofatto et al.

(10) Patent No.: US 8,868,975 B2
(45) Date of Patent: Oct. 21, 2014

(54) TESTING AND OPERATING A MULTIPROCESSOR CHIP WITH PROCESSOR REDUNDANCY

(75) Inventors: Ralph E. Bellofatto, Ridgefield, CT (US); Steven M. Douskey, Rochester, MN (US); Rudolf A. Haring, Cortlandt Manor, NY (US); Moyra K. McManus, Peekskill, NY (US); Martin Ohmacht, Yorktown Heights, NY (US); Dietmar Schmunkamp, Schoenaich (DE); Krishnan Sugavanam, Elmsford, NY (US); Bryan J. Weatherford, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 13/196,459

(22) Filed: Aug. 2, 2011

(65) Prior Publication Data

US 2013/0031418 A1  Jan. 31, 2013

Related U.S. Application Data

(60) Provisional application No. 61/511,807, filed on Jul. 26, 2011.

(51) Int. Cl.
*G06F 11/00* (2006.01)
*G06F 11/22* (2006.01)
*G06F 11/20* (2006.01)

(52) U.S. Cl.
CPC .......... *G06F 11/2242* (2013.01); *G06F 11/202* (2013.01)
USPC .................................. 714/30; 714/31; 714/40

(58) Field of Classification Search
CPC .. G01N 21/9501; G01N 21/01; G06F 11/273; G06F 21/77
USPC ................................................ 714/30, 31, 40
See application file for complete search history.

(56) References Cited

U.S. PATENT DOCUMENTS 4,181,940 A * 1/1980 Underwood et al. ........... 714/25
4,891,810 A   1/1990 de Corlieu et al.
(Continued)

FOREIGN PATENT DOCUMENTS

EP   0433979 A2   6/1991
FR   2606184      6/1988

OTHER PUBLICATIONS

Zarrineh, K.,et al., "System-on-Chip Testability Using LSSD Scan Structures," IEEE, May 2001.

(Continued)

*Primary Examiner* — Loan L. T. Truong
(74) *Attorney, Agent, or Firm* — Scully, Scott, Murphy & Presser, P.C.; Daniel P. Morris, Esq.

(57) ABSTRACT

A system and method for improving the yield rate of a multiprocessor semiconductor chip that includes primary processor cores and one or more redundant processor cores. A first tester conducts a first test on one or more processor cores, and encodes results of the first test in an on-chip non-volatile memory. A second tester conducts a second test on the processor cores, and encodes results of the second test in an external non-volatile storage device. An override bit of a multiplexer is set if a processor core fails the second test. In response to the override bit, the multiplexer selects a physical-to-logical mapping of processor IDs according to one of: the encoded results in the memory device or the encoded results in the external storage device. On-chip logic configures the processor cores according to the selected physical-to-logical mapping.

25 Claims, 9 Drawing Sheets

(56) References Cited

U.S. PATENT DOCUMENTS

| | | | | |
|---|---|---|---|---|
| 5,355,471 A * | 10/1994 | Weight | | 714/10 |
| 5,790,564 A | 8/1998 | Adams et al. | | |
| 6,170,070 B1 * | 1/2001 | Ju et al. | | 714/718 |
| 6,477,685 B1 * | 11/2002 | Lovelace | | 716/56 |
| 6,864,524 B2 * | 3/2005 | Masleid et al. | | 257/296 |
| 6,973,404 B1 * | 12/2005 | Krech, Jr. et al. | | 702/117 |
| 7,010,722 B2 * | 3/2006 | Jahnke | | 714/30 |
| 7,076,714 B2 * | 7/2006 | Cook, III et al. | | 714/742 |
| 7,170,299 B1 | 1/2007 | Anand et al. | | |
| 7,299,377 B2 * | 11/2007 | Norman | | 714/10 |
| 7,305,600 B2 | 12/2007 | Farnsworth, III et al. | | |
| 7,747,702 B2 * | 6/2010 | Anderson et al. | | 709/219 |
| 2001/0046168 A1 * | 11/2001 | Barth et al. | | 365/201 |
| 2002/0166062 A1 * | 11/2002 | Helbig, Sr. | | 713/200 |
| 2005/0172164 A1 | 8/2005 | Fox et al. | | |
| 2006/0184706 A1 * | 8/2006 | Fields et al. | | 710/305 |
| 2007/0076594 A1 * | 4/2007 | Khan et al. | | 370/220 |
| 2007/0300115 A1 * | 12/2007 | Datta et al. | | 714/738 |
| 2008/0068039 A1 * | 3/2008 | Bernstein et al. | | 326/16 |
| 2008/0091977 A1 * | 4/2008 | Miguelanez et al. | | 714/37 |
| 2008/0235454 A1 | 9/2008 | Duron et al. | | |
| 2009/0044049 A1 | 2/2009 | Luick | | |
| 2009/0204762 A1 | 8/2009 | Huott et al. | | |
| 2009/0241124 A1 * | 9/2009 | Denneau et al. | | 718/105 |
| 2010/0015732 A1 | 1/2010 | Bose et al. | | |
| 2011/0252260 A1 * | 10/2011 | Flachs et al. | | 713/324 |
| 2011/0271161 A1 * | 11/2011 | Kursun et al. | | 714/736 |

OTHER PUBLICATIONS

Schuster, S., "Multiple Word/Bit Line Redundancy for Semiconductor Memories", IEEE Journal of Solid-State Circuits, Oct. 1978, vol. SC-13, No. 5.

Makar, S., et al., "Testing of Vega2, a chip multi-processor with spare processors", Test Conference, ITC, IEEE International, Oct. 21-26, 2007, pp. 1-10, Santa Clara, CA.

* cited by examiner

TESTING AND OPERATING A MULTIPROCESSOR CHIP WITH PROCESSOR REDUNDANCY

CROSS-REFERENCE TO RELATED APPLICATION

This application claims the benefit of U.S. Patent Application Ser. No. 61/511,807 filed Jul. 26, 2011 for "TESTING AND OPERATING A MULTIPROCESSOR CHIP WITH PROCESSOR REDUNDANCY".

GOVERNMENT CONTRACT

This invention was made with Government support under Contract No. B554331 awarded by Department of Energy. The Government has certain rights in this invention.

BACKGROUND

The present disclosure relates to improving the yield rate of a multiprocessor semiconductor chip. More particularly, the disclosure relates to a system and a method for providing at least one redundant processor core in the multiprocessor semiconductor chip.

In order to increase functionality and performance, microprocessor chips are increasingly being built with multiple processor cores. This has become feasible as, with shrinking device technologies, a size of a typical processor core is shrinking, so that it becomes possible to add extra processor cores onto a semiconductor chip. On the other hand, notwithstanding the shrinking device technologies (e.g., 22 nm CMOS technology), multiprocessor semiconductor chips typically have large chip sizes (e.g., 6 cm$^2$), as demands on the number of processors also leads to a commensurate increase in cache size and other on-chip resources. However, manufacturing yield for semiconductor chips generally decreases steeply with increasing semiconductor chip size, if the yield is limited by random defects. Decreasing yield with increasing semiconductor chip size leads to markedly increasing cost with the increasing semiconductor chip size.

This phenomenon has been observed before with memory chips (or memory arrays on logic chips): as technologies shrank and memory sizes grew, defect-limited yield became a problem. The well-known solution to decreasing yield rate of memory device has been to introduce redundancy into the memory arrays, i.e. redundant word lines or redundant bit lines. At a manufacturing test, fails in an array are diagnosed, and it is determined whether the array is repairable by mapping out certain word and/or bit lines associated with the fails, effectively replacing them with the provided redundant word and/or bit lines. Configuration information (e.g., mapping logical addresses of failed word/bit lines to physical addresses of redundant word/bit lines) for these array repairs are typically encoded into fuses (i.e., non-volatile storage) on the chip. As a result of this redundancy scheme, there is no noticeable difference to the end user between a semiconductor chip with perfect arrays and a chip with repaired arrays.

The impact of array redundancy on yield rate is remarkable: as long as enough redundancy is provided so that all arrays are fixable, the number and size of redundant arrays on a semiconductor chip will have very little effect on the yield rate. The positive effect on the yield rate and chip cost due to redundancy far outweighs the negative effect due to the larger array sizes with the additional redundant word and/or bit lines.

SUMMARY OF THE INVENTION

The present disclosure describes a system, method and computer program product for improving the yield rate of a multiprocessor semiconductor chip that includes a plurality of processor cores and one or more redundant processor cores.

In one embodiment, a system is provided for improving the yield rate of a multiprocessor semiconductor chip that includes primary processor cores and one or more redundant processor cores. A first tester conducts a first test on one or more processor cores in the multiprocessor semiconductor chip. The first tester encodes results of the first test in an on-chip non-volatile memory device in the multiprocessor semiconductor chip. A second tester conducts a second test on the one or more processor cores in the multiprocessor semiconductor chip. The second tester encodes results of the second test in an external non-volatile storage device. The second tester also encodes an override bit in the external non-volatile storage device in response to determining that at least one processor core in the multiprocessor semiconductor chip fails the second test. At each subsequent power-on of the multiprocessor semiconductor chip, a controller reads the override bit from the external non-volatile storage device and uses it to drive a multiplexer. In response to the read override bit, the multiplexer selects a physical-to-logical mapping of IDs of the primary processor cores and the redundant processor cores according to one of: the encoded results in the external non-volatile storage device, or the encoded results in the results in the external non-volatile storage device. On-chip logic configures the primary processor cores and the redundant processor cores according to the selected physical-to-logical mapping.

In a further embodiment, the multiplexer selects a physical-to-logical mapping of identifiers (IDs) of the primary processor cores and the redundant processor cores according to the encoded results in the on-chip non-volatile memory device in response to determining that the read override bit is not set. The multiplexer selects a physical-to-logical mapping of IDs of the primary processor cores and the redundant processor cores according to the encoded results in the external non-volatile storage device in response to determining that the read override bit is set.

In a further embodiment, all logical IDs of processor cores to run software are mapped to physical IDs of processor cores that have passed all the tests, while skipping any physical ID of any processor core that has failed the first test or second test.

In a further embodiment, the first tester updates the on-chip non-volatile memory device with a result of a further test whenever the first tester conducts the further test, and the second tester updates the external non-volatile storage device with a result of an additional test whenever the second tester conducts the additional test.

In a further embodiment, the software runs unchanged on the multiprocessor semiconductor chip regardless of whether the software is using the one or more redundant processor cores.

In a further embodiment, a failed processor core is shut down.

In a further embodiment, the one or more redundant processor cores are shut down if no processor core is failed in the first test or the second test.

In a further embodiment, the first test includes one or more of: a wafer test and a module test.

In a further embodiment, the second test includes one or more of: a card test and an in-system test.

In a further embodiment, the on-chip memory device includes electronic fuses (eFuses).

In a further embodiment, the external non-volatile storage device includes one or more of: an EPROM, an EEPROM and a Flash memory device.

In a further embodiment, while designing the multiprocessor semiconductor chip, a simulation tool verifies operations of all processor cores in the multiprocessor semiconductor chip by testing all possible physical-to-logical mappings of IDs of the primary processor cores and the redundant processor cores.

In a further embodiment, the on-chip non-volatile memory device in the multiprocessor semiconductor chip includes a set of multiple registers. Each register in the on-chip non-volatile memory device stores a different physical-to-logical mapping of IDs of the primary processor cores and the redundant processor cores.

In a further embodiment, the on-chip non-volatile memory device in the multiprocessor semiconductor chip further includes configuration bits that select one register among the multiple registers.

In a further embodiment, the selected physical-to-logical mapping of IDs of the primary processor cores and the redundant processor cores uses a subset of all physical processor cores in the multiprocessor semiconductor chip.

BRIEF DESCRIPTION OF THE DRAWINGS

The accompanying drawings are included to provide a further understanding of the present invention, and are incorporated in and constitute a part of this specification.

DETAILED DESCRIPTION

Figure 2A:
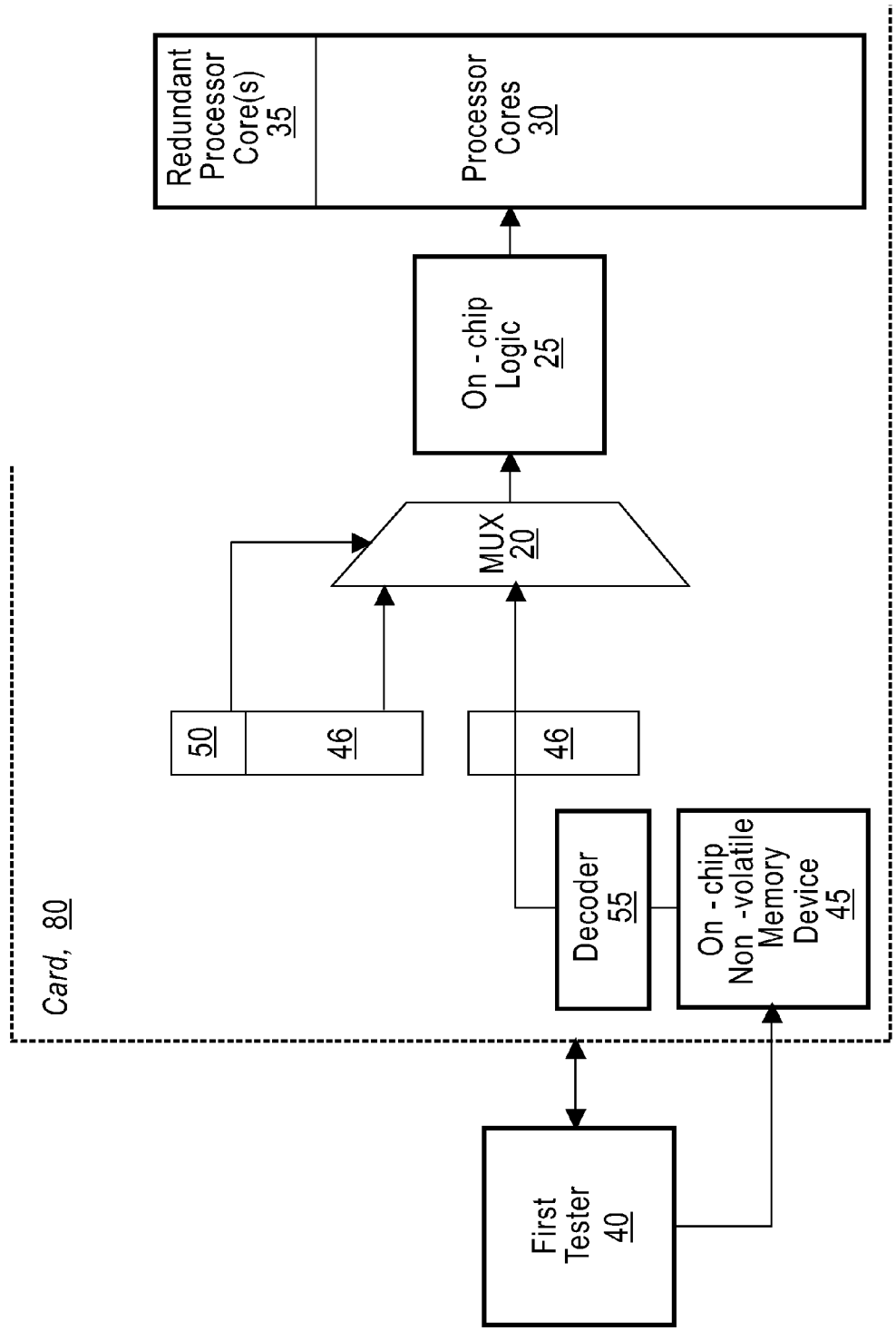
FIGS. 2A and B is a two-part system diagram for improving the yield rate of a multiprocessor semiconductor chip in one embodiment.
Figure 2B:
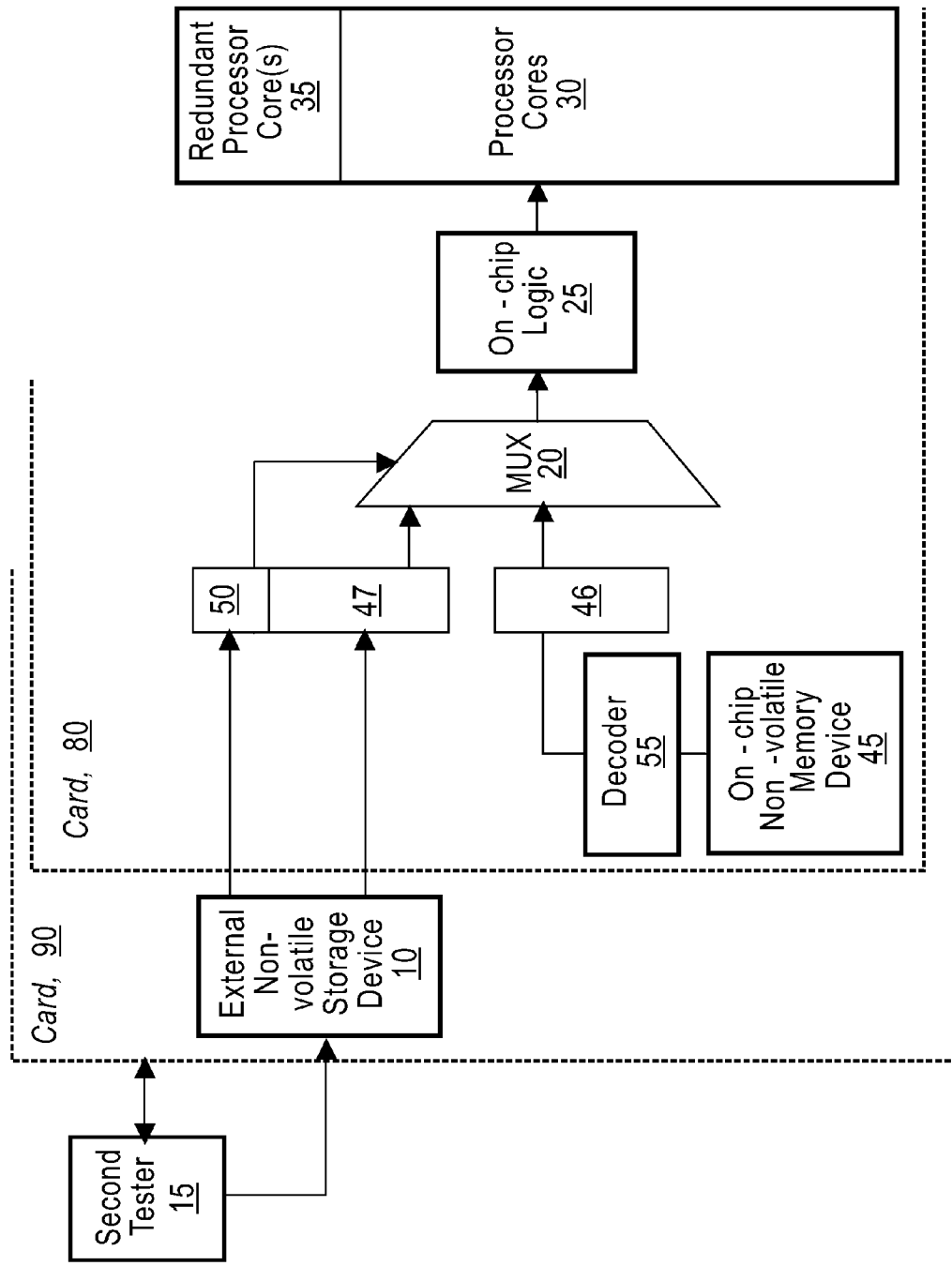

In one embodiment, by adding a "spare" or "redundant" processor core (e.g., a redundant processor core(s) 35 shown in FIGS. 2A and 2B) to a multiprocessor semiconductor chip, a chip repair methodology is achieved that has a positive effect on yield rate. A positive effect on the yield rate outweighs the cost associated with the additional chip area due to the redundant processor core(s) 35 and the logic described in this disclosure. According to this embodiment, one or more tester(s) perform(s) one or more tests that determine whether a processor core passes or fails the one more tests. These tests and testers can be separated in place and time. An indication of failed and passed processor cores is carried in on-chip non-volatile memory device (e.g., an on-chip non-volatile memory device 45 shown in FIG. 2A) or an external non-volatile storage device (e.g., an external non-volatile storage device 10 shown in FIG. 2B). A semiconductor chip re-configuration (i.e., skipping a failed processor core and employing a redundant processor core) is performed by re-doing a physical-to-logical mapping of IDs of processor cores as exemplarily shown in FIG. 4. The chip re-configuration can be verified, e.g., conducting a failed test on the failed processor core again, and can be re-done upon finding an error in that test. Software runs unchanged on the multiprocessor semiconductor chip regardless of whether the software is using all tested-good processor cores (i.e., there is no use of a redundant processor core) or a repaired chip using the one or more redundant processor cores.

This present disclosure describes a methodology to achieve an improvement in yield rate of a multiprocessor semiconductor chip. The methodology includes following characteristics:

1. Determining whether a processor core is defective or not, e.g., by conducting one or more tests (e.g., logic test, wafer test, in-system test, card test, module test, etc.).
2. Encoding of results of the one or more tests in an on-chip non-volatile memory device (e.g., eFuses (electronic fuses), etc.) or an external non-volatile storage device (e.g., EEPROM or EPROM or Flash memory device, etc.). A reference to Darren L. Anand, et al., entitled "Electronic fuse blow mimic and methods for adjusting electronic fuse blow," U.S. Pat. No. 7,170,299, wholly incorporated by reference as if set forth herein, describes eFuse in detail.
3. On-chip logic 25 shown in FIGS. 2A-2B enables physical processor cores according to a physical-to-logical mapping of processors IDs encoded in the on-chip non-volatile memory device or the external non-volatile storage device. This enabling of the physical processor cores result in the logical processor IDs forming an unbroken sequence of physical processor cores which have not failed any test.
4. The one or more tester(s) can update the on-chip non-volatile memory device or the external non-volatile storage device upon conducting one or more additional tests on the multiprocessor semiconductor chip. This update capability can be used for a verification of the test results, e.g., testing all possible configuration of physical-to-logical mapping of processor IDs, and for additional repairs, e.g., in-system repair.

FIGS. 2A and 2B illustrates system diagrams for improving the yield rate of a multiprocessor semiconductor chip in one embodiment. The multiprocessor semiconductor chip 80 includes, but is not limited to: an on-chip non-volatile memory device 45, a multiplexer 20, on-chip logic 25, and a set of multiple processor cores 30 that includes one or more redundant processor core(s) 35. A first tester 40 is temporarily attached to the multiprocessor semiconductor chip 80 while conducting a first test, e.g., by using a test system shown in FIG. 1. A first test, conducted by the first tester 40, includes one or more of: a wafer test, a module test, etc. The first tester 40 encodes results of the first test in the on-chip non-volatile memory device 45 in the multiprocessor semiconductor chip.

In a further embodiment, shown in FIG. 2B, the multiprocessor semiconductor chip 80 is assembled onto a card (or multi-chip module) 90 that includes, but is not limited to: the multiprocessor semiconductor chip 80 and an external non-volatile storage device 10 (e.g., EEPROM, etc.). A second tester 15 is temporarily attached to the card 90 to conduct a second set of tests, i.e., one or more of: a card test, an in-system test, etc. The second tester 15 encodes results of the second test in the external non-volatile storage device 10. The second tester 15 also encodes an override bit in the external non-volatile storage device if at least one processor core in the multiprocessor semiconductor chip fails the second test.

A controller (e.g., control software or firmware or hardware state machine) reads the external storage device 10 and copies the results of the second test into an on-chip register 47, and copies the override bit into on-chip register bit 50 (which can be an extension of register 47). The on-chip multiplexer 20 receives three inputs: a first data input (i.e., the encoded test results, stored in the on-chip non-volatile memory device 45, which are optionally passed through a decoder 55 and a staging register 46), a second data input (i.e., the encoded test results, stored in the external non-volatile storage device 10, which are passed through a staging register 47), and a third select input (i.e., an override bit 50, also stored in external non-volatile storage device 10, and passed through staging register 47 (which includes bit 50). The override bit 50 is used to select the second data input over the first data input whenever the override bit is set. In response to the override bit, the multiplexer 20 selects a physical-to-logical mapping of IDs of processor cores 30 (including the redundant processor cores 35) according to one of: the encoded results in the on-chip non-volatile memory device, or the encoded results in the external non-volatile storage device. For example, the multiplexer 20 selects a physical-to-logical mapping of IDs of processor cores 30 (including the redundant processor cores 35) according to the encoded results in the on-chip non-volatile memory device 45 if the override bit 50 is not set. The multiplexer 20 selects the physical-to-logical mapping of IDs of the processor cores according to the encoded results in the external non-volatile storage device 10 if the override bit 50 is set. The on-chip logic 25 distributes the selected mapping and configures the processor cores 30 and 35 according to this mapping, as exemplified in FIG. 4, described in detail below.

The selected physical-to-logical mapping of the processor core IDs includes: mapping all logical processor IDs required to run software to physical IDs of processor cores that have passed all tests, while skipping any physical ID of any processor core that has failed a test and employing a physical ID of a redundant processor core in the place of the skipped physical ID of the failed processor core, as exemplified in FIG. 4 described in detail below. As result of this mapping, the redundant processor core is used instead of the failed processor core in order to run software. Whenever a user powers on the multiprocessor semiconductor chip, the on-chip logic 25 drives the selected physical-to-logical mapping of IDs of the processor cores such that logical IDs of processor cores recognized by software are mapped to tested-good physical processor cores (i.e., physical processor cores that have passed all the tests). Thus, there is no impact on an end user and software even if at least one redundant processor core is used instead of the failed processor core(s). The software running on the multiprocessor semiconductor runs unchanged whether the processor core ID mapping uses the redundant processor core(s) or not. To conserve power consumption, the failed processor core is shut down or operates in low-power mode. The redundant processor core is shut down or operates in low-power mode if it is unused, i.e., if no processor core failed in the first test and the second test.

In one embodiment, the on-chip non-volatile memory in the multiprocessor semiconductor chip includes a set of multiple registers (not shown). Each register in the on-chip non-volatile memory device stores a different physical-to-logical mapping of IDs of the processors cores 30 and the redundant processor cores 35. The on-chip non-volatile memory device 45 in the multiprocessor semiconductor chip further includes configuration bits (not shown) that select one register among the multiple registers (not shown).

Figure 1:
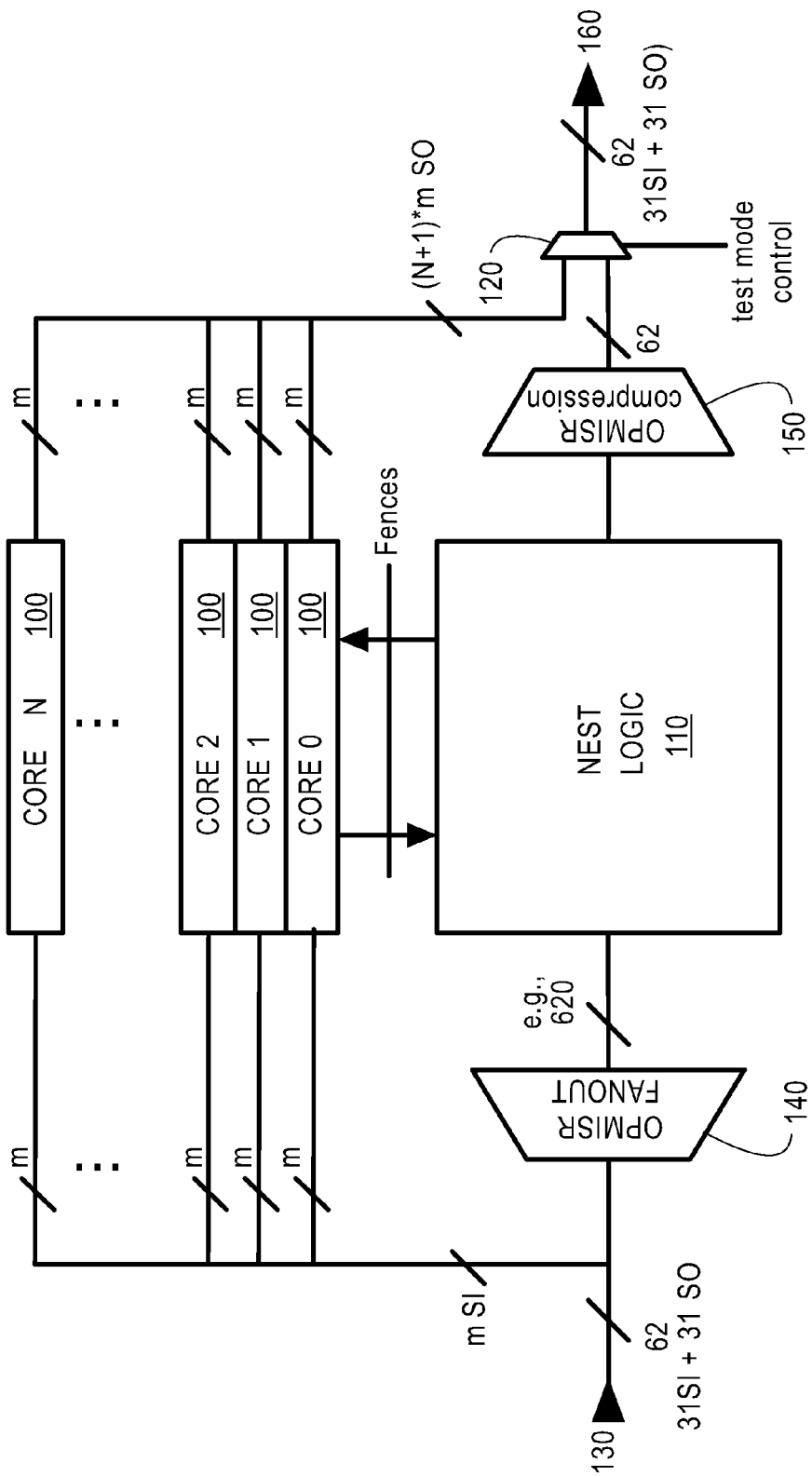
FIG. 1 illustrates a prior art arrangement of scan chains for a chip with "N+1" processor cores that determines a physical ID of a processor failed at a manufacturing test in one embodiment.

FIG. 1 illustrates a system diagram of a currently implemented system that may be used to conduct the first test (e.g., wafer test, etc.). The system shown in FIG. 1 follows a prior art system described in Leonard. O. Farnsworth III et. al., U.S. Pat. No. 7,305,600, wholly incorporated by reference as if set forth herein, to determine whether any processor core passes or fails a manufacturing test. Manufacturing test, in this disclosure, stands for a structure-based logic test, a level sensitive scan design (LSSD) test, or a general scan design (GSD) test, where an external wafer or module tester applies test patterns on scan-in pins (SI) to a semiconductor chip, and observes the scan-out (SO) pins. A reference to Kamran Zarrineh, entitled "System-on-Chip Testability Using LSSD Scan Structures," IEEE, May 2001, wholly incorporated by reference as if set forth herein, describes LSSD test in detail. An incorrect value on a scan-out pin indicates a logic fail. FIG. 1 illustrates an exemplary arrangement of scan chains on a semiconductor chip, which includes a plurality of processor cores 100, as well as a non-redundant logic ("nest logic" 110) external to the processors. The scan chains begin at scan-inputs 130 and end at scan outputs 160. There may be a limited set of physical scan pins (e.g., 62 scan pins), which, dependent on a test mode, can be partitioned between logical scan-ins and logical scan-outs. For example, assume that the "nest logic" is implemented and tested as a conventional ASIC, with, for example, 62 total scan pins. Then, conventional logic test modes may be applied as follows:

1. A deterministic scan test mode, where the 62 scan pins are partitioned as 31 scan-ins and 32 scan outs.
2. An OPMISR (on product multiple input signature register) mode in which all 62 scan pins are first used as scan inputs 130. These are fanned out 140 by, e.g. a factor of 10 to be the inputs for 620 short scan channels. The outputs of the 620 scan channels are collected and compressed in a Multiple Input Signature Register (MISR) 150. At the end of the test, the 62 scan pins are reconfigured as outputs 160, and MISR contents, known as the signature, is observed.

For this flexible use of scan pins, a separate test mode for "N+1" redundant processor cores can be added: the 62 total scan pins are partitioned in "m" scan-in pins, and, in this example, (N+1)×m scan-out pins as indicated in FIG. 1. The scan pin partitioning generally involves one or more multiplexers (120) driven by test mode control signals.

The "m" scan-in pins feed all processor cores in parallel and simultaneously, so that all processor cores will see the same scan patterns. The "m" scan outputs of each core are all routed to individual scan-out pins, so that there will be (N+1)×m scan-out pins. With this scheme, a fail in a logic test observed on a particular scan-out pin will be directly and uniquely related to a failing processor core, to identify the failing processor core. This scan chain partitioning uses a bandwidth through the scan pins as efficiently as possible, to minimize a total testing time. With the example of 62 total scan pins, this test uses (N+2)×m pins, so that there is a constraint: (N+2)×m<=62.

For example, with 62 scan pins, "m" can be three for up to "N"=18 (i.e. N+1=19 total processor cores on chip). With the same 62 scan pin constraint, "m" can be two for up to "N"=29 processor cores. Beyond that point (i.e., "N">29), and up to "N"=60, there can be only a single scan chain ("m"=1). At that point (i.e., "N">29), it may become more efficient to switch to two test modes, each testing about half of all the processor cores.

For example, under the same 62 total scan pin constraint, e.g., N=32 (N+1=33 total cores on board), it may be more advantageous to test the processor cores, for example, in two sub-groups: a group of 16 and a group of 17. Each sub-group can use three scan chains per a processor core ("m"=3), as opposed to a total group (i.e., testing all the processors in a group) that can use only one scan chain per processor core ("m"=1). Then, each sub-group can be tested in ⅓ of the test time of the total group.

If a semiconductor chip includes arrays or other "black box" macros, then additional test modes may be applied in the manufacturing test to test these. If fails of such tests can be isolated to macros residing in a particular processor core, then such tests can also contribute to determining which processor cores pass or fail the additional test modes.

Figure 3A:
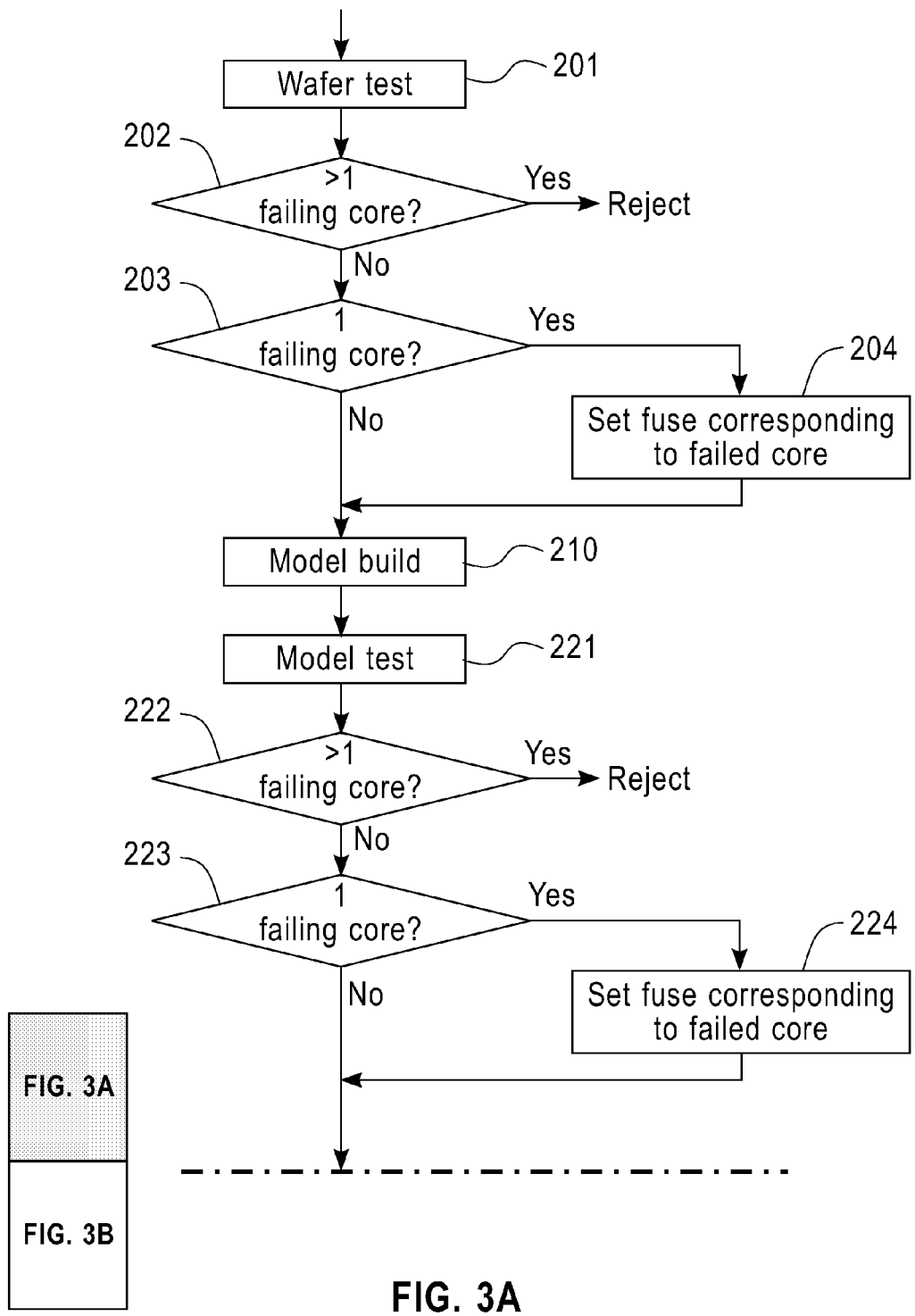
FIGS. 3A-3B is a flow chart of improving the yield rate of a multiprocessor semiconductor chip in one embodiment.
Figure 3B:
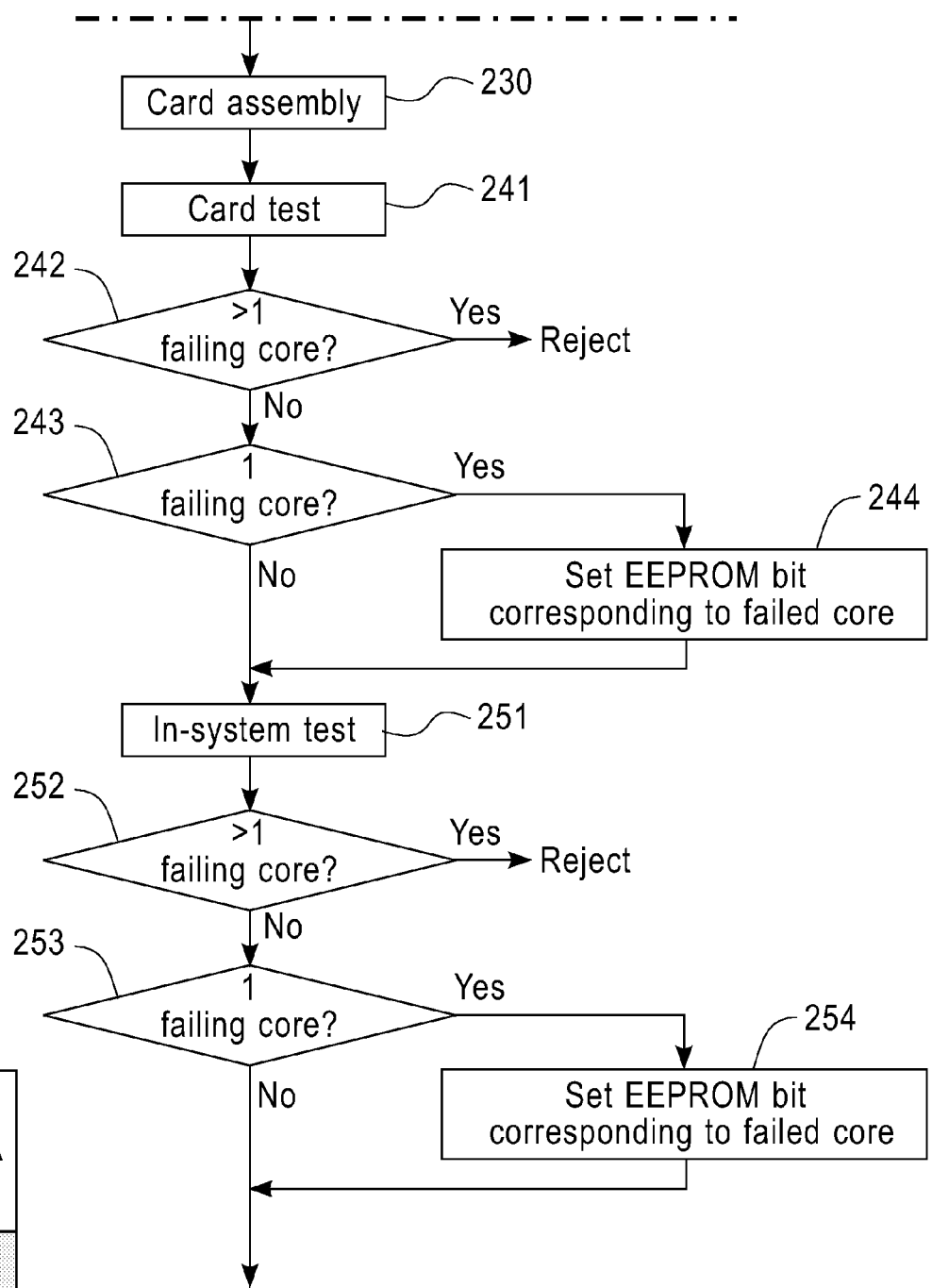

FIGS. 3A-3B is a flow chart that describes method steps for improving the yield rate of a multiprocessor semiconductor chip in one embodiment. A first tester (e.g., a first tester 40 shown in FIG. 2A) tests finished wafers (i.e., a finished wafer includes a plurality of multiprocessor semiconductor chips, and each multiprocessor semiconductor chip includes a plurality of processor cores, some of which are redundant processor cores) at a wafer test (201). Dies of each wafer that pass the wafer test are built into modules (210). A module tester (another instance of the first tester 40) conducts a module test (221) on the modules. Modules that pass the module test are assembled onto cards (230). A second tester (e.g., a second tester 15 shown in FIG. 2B) conducts a card test (241). After assembly of the cards into a system, there may optionally be an in-system test (251) conducted by a third tester (e.g., another instance of the second tester).

Each stage of testing has different test coverage characteristics. Wafer and module tests are based on structural testing (based on scan patterns), using the scan pins as described above. Wafer test may only have slow ("DC") coverage, whereas module test may in addition have at-speed coverage. Card test and in-system test may use built-in self test (e.g., Array-Built-In Self Test "ABIST", Logic Built-in Self Test "LBIST"), and will also use functional test cases. A reference to Robert Dean Adams, entitled "Memory array built-in self-test circuit having a programmable pattern generator for allowing unique read/write operations to adjacent memory cells, and method therefor," U.S. Pat. No. 5,790,564, wholly incorporated by reference as if set forth herein, describes ABIST in detail. Test conditions (e.g., temperature, voltage, etc.) will also vary between the tests. Each stage of testing may therefore uncover different types of defects, and may find a fail in a multiprocessor semiconductor chip. If the fail can be isolated to a processor core, and if there is still a redundant processor core left on the multiprocessor semiconductor chip (i.e. not all redundant processors have been taken in use yet in earlier test stages), then the semiconductor chip is repairable, and can flow to the next stage. In FIG. 3, it is assumed that there is only a single redundant processor core per multiprocessor semiconductor chip, so that after each test, it is first determined whether the semiconductor chip is repairable: i.e. whether 0 or 1 processors have failed so far. If more than one processor core has failed (including any failed cores in previous tests), then the semiconductor chip is rejected (steps 202, 222, 242, 252). If the fail in the current test stage is the first and only fail (steps 203, 223, 243, 253), then the location (physical identifier) of the failing processor core is encoded. In steps 204 and 224, failing core information (e.g., a physical identifier of the failing processor core) is encoded into the on-chip non-volatile memory device (e.g., eFuses, etc.) at wafer test and at module test. However, once the semiconductor chip is mounted on a card, on-chip fuse blow (e.g., updating eFuses, etc.) is not accessible anymore. Therefore, after card assembly (230), any further processor core fail information as determined at card test (241-243) or in system test (251-253) will be encoded in an external non-volatile storage device (e.g., an on-card EEPROM (steps 244, 254, respectively), along with other card data (e.g., vital product data "VPD").

If there is more than one redundant processor core on board, e.g., "R" redundant cores, then the rejection criterion in steps 202, 222, 242, 252 is modified to determine whether more than "R" processor cores in total have failed (including any failed cores at previous test stages); and the repair criterion of steps 203, 223, 243, 253 is modified to determine whether at least one processor core has newly failed at the current test stage.

In one embodiment, the encoding of the physical IDs of the processor cores failing test(s) is performed in a manner that allows an incremental addition of subsequent failed processor core information. For example, the on-chip non-volatile memory device or the external non-volatile storage device has a field that has a single bit per each core. If an unfailed processor core has the logical value '0', and a failed processor core has the value '1', then the field is a binary string with '0' representing a processor core that passed test, and '1' representing a processor core that failed test. If eFuses are used for the on-chip non-volatile memory device, at a given test, a fuse corresponding to a processor core passing the test is not blown, i.e., a corresponding bit is set to '0', and a fuse corresponding a processor core failing the test is blown, i.e., a corresponding bit is set to '1'.

For example, on a multiprocessor semiconductor chip with, for example, 18 processor cores, an all-good chip (i.e., an semiconductor chip that has no failed processor core) would have a bit string that is '0000 0000 0000 0000 00'; a multiprocessor semiconductor chip where processor core #5 (counting from 0) has failed the wafer test will have '0000 0100 0000 0000 00'; a multiprocessor semiconductor chip where a processor core #5 has failed wafer test, and a processor core #11 "has subsequently failed the module test will have '0000 0100 0001 0000 00', etc. The incremental information from the later test stage is encoded, e.g., by setting one or more bits in the bit string as "1".

In one embodiment, there is also provided a decoder (e.g., decoder 55 shown in FIG. 2A) in the multiprocessor semiconductor chip that decodes the encoded information in the on-chip non-volatile memory device and the external non-volatile storage device. For example, if the on-chip non-volatile memory device or the external non-volatile storage device includes a bit string "0000 0100 0001 0000 00" that indicates failed processor cores, the decoder 55 would interpret this bit string to identify that the processor cores #5 and #11 are defective.

Returning to FIG. 3, at card test (241), the encoded information (i.e., test results) in the on-chip non-volatile memory device is first copied from the on-chip non-volatile memory device into the corresponding field of the external non-volatile storage device (e.g., on-card EEPROM). Henceforth in the test flow, further failing processor cores are encoded in the external non-volatile storage device.

Figure 4:
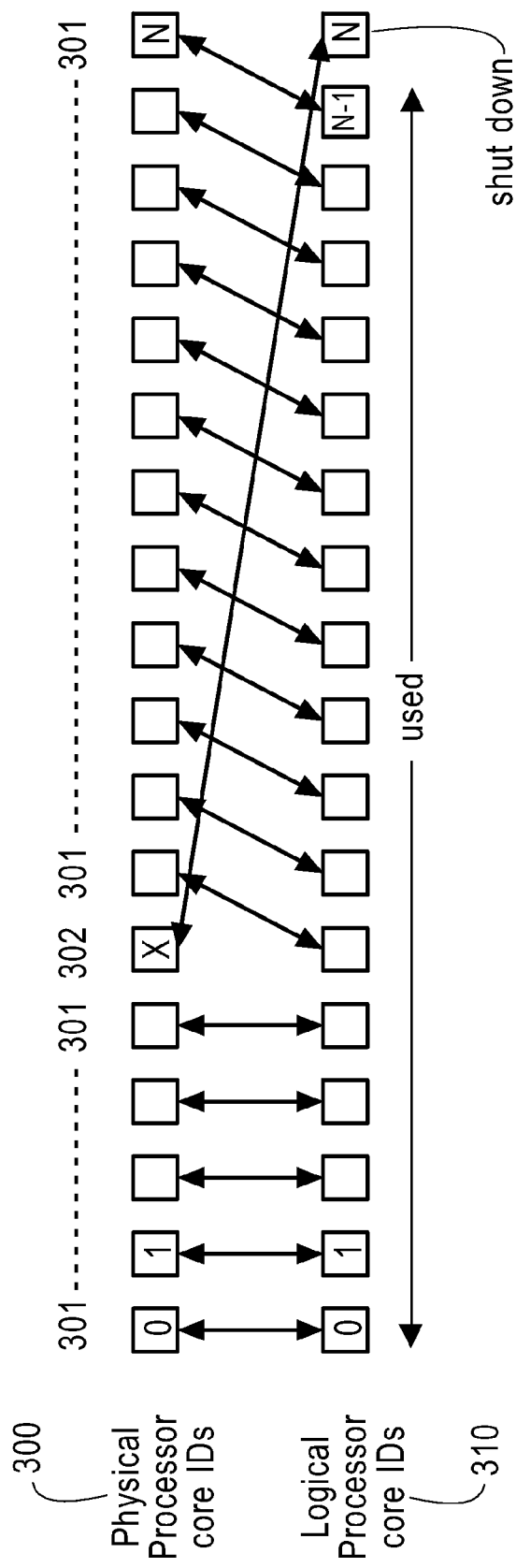
FIG. 4 illustrates a physical-to-logical mapping of processor IDs that assigns logical processor IDs to tested-good processor cores (i.e., processor cores that have passed all the tests), while skipping failed processor cores and employing a redundant processor core in one embodiment.

FIG. 4 illustrates how the encoded information (e.g., test results of processor cores) is used. The information encoded in the on-chip non-volatile memory device (or, if present, the information encoded in the external non-volatile storage device in FIG. 2B) is read, e.g., by the on-chip logic, to identify failed processor core(s), if any. In the example of FIG. 4, the "N+1" processors on a multiprocessor semiconductor chip includes a series of tested-good processors (i.e., processors that have passed all the tests) (301) and includes a failed processor (302), schematically identified by an 'X'. In this example, the encoded information (from the on-chip non-volatile memory device and/or external non-volatile storage device) show that a processor core with a physical ID 'F' (in this example, F=5) has failed a previous test. The on-chip logic (e.g., on-chip logic 25 shown in FIG. 2) performs a physical ID (identifier) (300) to logical ID (310) mapping, for example, The processor core with ID=F is mapped to the last logical ID, N.

For processor cores with physical ID<F, logical ID=physical ID.

For processor cores with physical ID>F, logical ID=physical ID−1.

This mapping is schematically shown in FIG. 4. The effect is that from a logical ID perspective, as shown in FIG. 4, there is a contiguous sequence of logical ID=0 to "N−1" of the tested-good processor cores that can be used by software. The contiguous sequence of logic IDs of the tested-good processor cores (i.e., processor cores that have not failed any test) are followed by logic ID of the processor cores that failed test(s).

In FIG. 4, for a perfect semiconductor chip (i.e., no failed processor cores), the on-chip logic arbitrarily sets "F" to any number from 0 to "N." Customarily, in that case, the on-chip logic sets "F=N."

In one embodiment, in FIG. 4, software running on the multiprocessor semiconductor chip utilizes a set of the tested-good processor cores identified by the contiguous sequence of the logic IDs 0 to "N−1", and the on-chip logic 25 shown in FIGS. 2A-2B shuts down the processor core with logical ID="N", i.e., permanently puts in a state that uses no electric power or a minimal electric power. If there was a failed processor core 302, this action (i.e., shutting down a processor core whose logical ID is "N") shuts down that failed processor core. If there was no failed processor, the on-chip logic shuts down a redundant processor core.

Figure 5:
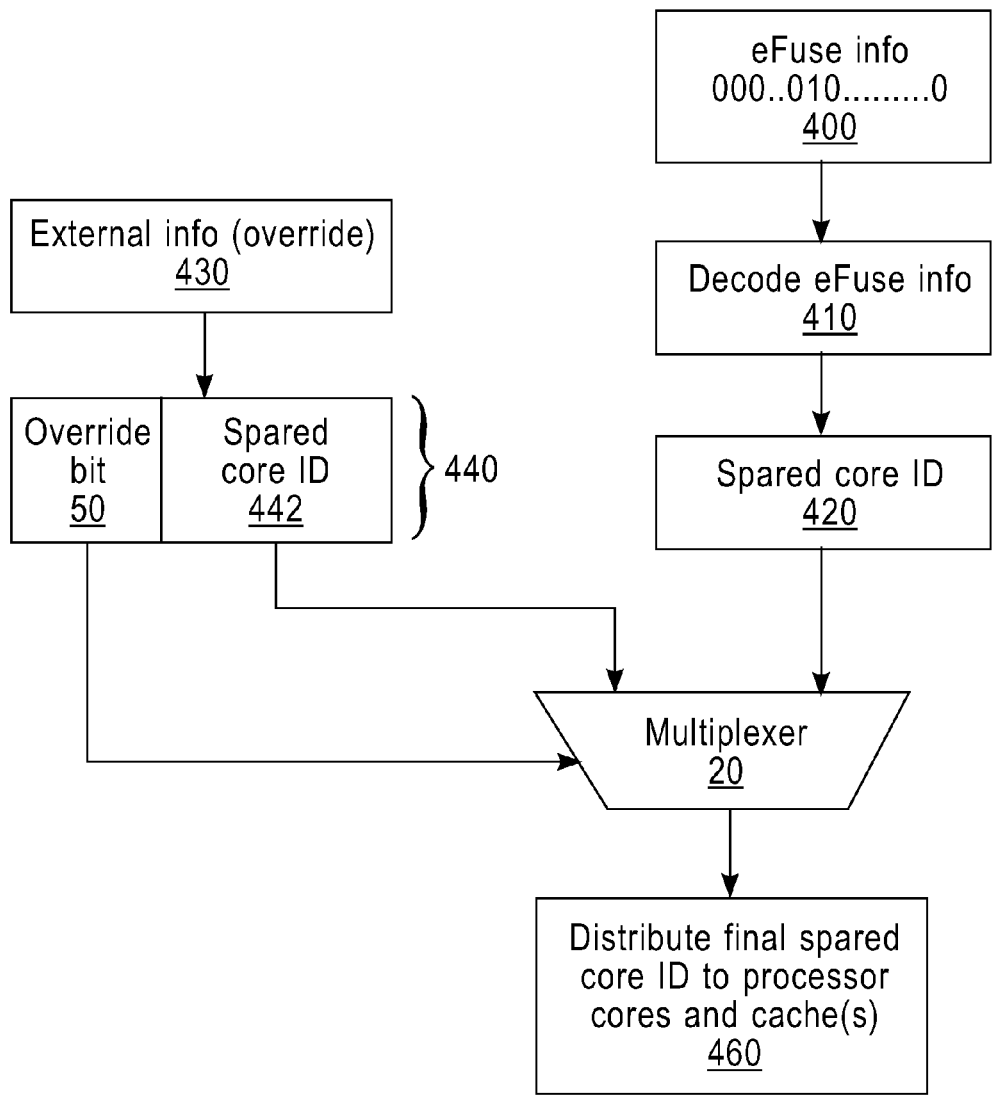
FIG. 5 is a flow chart that describes method steps performed by the on-chip logic in one embodiment.

FIG. 5 is a flow chart that describes method steps performed by the on-chip logic with an override capability in one embodiment. Note that the multiplexer 20 in FIG. 2 is the same multiplexer 20 in FIG. 5. A bit string 400 show in FIG. 5 refers to the encoded test results stored in the on-chip non-volatile memory device 45. External information 430 shown in FIG. 5 refers to the encoded test results stored in the external non-volatile storage device 10. The encoded test results in the on-chip non-volatile memory, represented by the bit string (400), is extracted to identify the physical processor ID 'F' of a first failed processor core, corresponding to the first '1' in the bit string 400. If there is no '1' in the bit string, i.e. no failed processor cores in the multiprocessor semiconductor chip, the on-chip logic arbitrarily sets "F=N."

This decoding 410 (which uses the decoder 55 in FIG. 2A or 2B) results in a physical ID 'F' of the first failed processor core to be written to a register 420 (which is the same register 46 shown in FIGS. 2A-2B). If there is external information 430 (from the external non-volatile storage device or from software for any reason, e.g. logic verification), then a register 440 (which is the same register 47 shown in FIGS. 2A-2B) is written with a physical ID 442 of a failed processor core, along with an override bit 50. The override bit 50 drives a selection input of a multiplexer 20. If the override bit 50 is not set, the value of register 420 will be distributed 460 to the on-chip logic and drive the physical-to-logical ID mapping as exemplarily shown in FIG. 4. However, if the override bit 50 is set, the multiplexer 20 will select the value 442 of register 440 to be distributed 460 and drive the mapping accordingly.

The distribution and mapping logic 460 is the same as the on-chip logic 25 of FIGS. 2a and 2b.

In one embodiment, the physical-to-logical ID mapping, as driven by the value F of the register 420 or 440, is performed at any place in the on-chip logic (e.g. processor cores, cache memories, etc.) that uses processor ID.

When this has been accomplished, software running on the multiprocessor semiconductor chip only deals with a sequence of logical IDs 0 to N−1 of processor cores, representing the N tested-good processors (310), no matter what the failed processor F was (if any). The same software will thus be able to run identically on all semiconductor processor cores, regardless of using a redundant processor core instead of a failed processor core. Thus, from a software perspective, repaired semiconductor chips (i.e., semiconductor chips that use redundant processor cores to replace failed processor cores) will behave identically to perfect chips (i.e., semiconductor chips that have no failed processor cores).

The flow chart of FIGS. 3A-3B represent a single part number flow. Logistics of manufacturing and testing only needs to accommodate a single part number for the multiprocessor semiconductor chip or card, regardless of what repairs happened at what stage, and what identity of a failed core (if any) may have been. In other words, various testing results and repair information (i.e., re-mapping of physical-to-logical processor IDs) at various testing stages are encoded in the on-chip non-volatile memory device or the external non-volatile storage device. Different semiconductor chips or cards with different repairs do not need to be kept separated as different parts with different characteristics.

According to the flow chart in FIG. 3, for early hardware development, the wafer and module tests can still be in development, and may have test escapes, i.e., let semiconductor chips with defective processor cores go through to a next step in a test process. This is not a problem as long as downstream tests (e.g., card tests, in-system test, etc.) find the defective processor. In which case, the newly found fails are repaired e.g. using steps 241-244 at card test, or even using steps 251-254 at in-system test. This late-repair capability removes the requirement of full development of wafer and module tests from a project schedule, and allows hardware and software to be developed earlier. The further development of the wafer and module test then becomes an incremental improvement in the rate of test escapes, but does not hold up development further downstream in the manufacturing, assembly and test processes. As such, the flow chart shown in FIGS. 3A-3B also implements a schedule risk mitigation.

Figure 6:
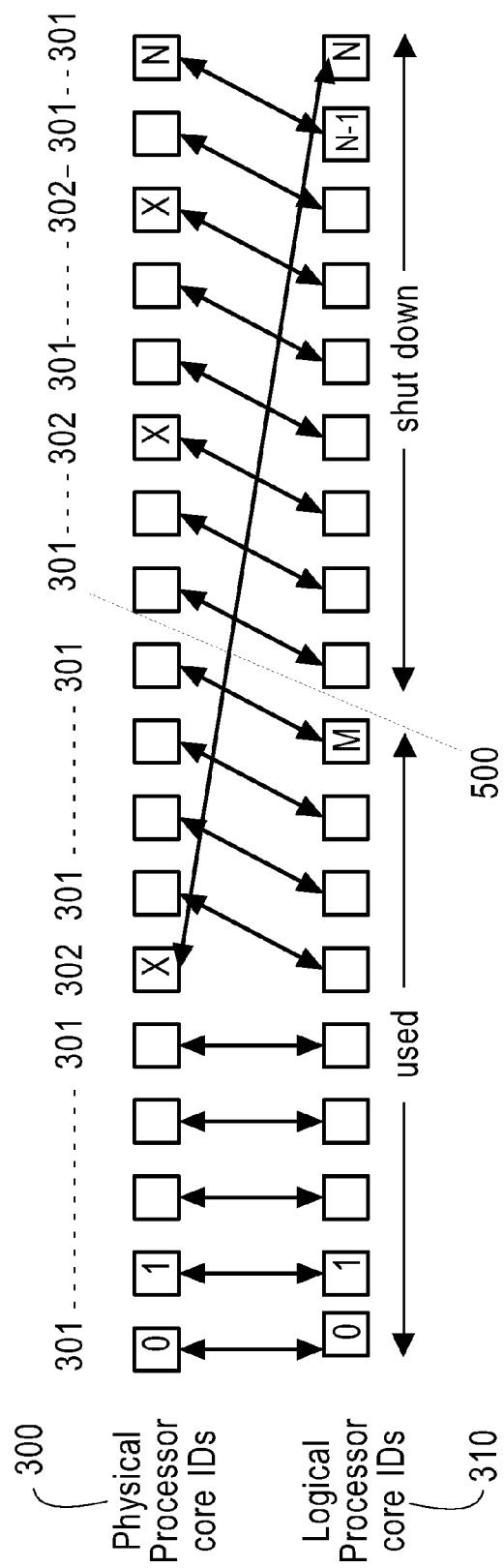
FIG. 6 illustrates an exemplary physical-to-logical mapping of processor IDs in one embodiment.

FIG. 6 describes a variation of using a redundant processor core in one embodiment. If a large proportion of a semiconductor chip have multiple processor cores failing test(s), then the on-chip logic is adapted to yield "half good" chips (i.e., using a half of all the processor cores, which pass all the tests). The mapping in FIG. 6 is the same as in FIG. 4. If, e.g. for an early software development, a multiprocessor semiconductor chip in which only "M+1" processor cores are usable (i.e. logical IDs 0 to M, with M<N), then the criterion is that there should be at most one failed processor core 302 among physical IDs 0 to M+1 (i.e. to the left of dividing line 500). After mapping out this failed processor core in the same way as described with FIG. 4, only processor cores with logical ID 0 to "M" are used, and the others (i.e. all logical IDs to the right of dividing line 500) are shut down. With this scheme shown in FIG. 6, a yield rate can be recovered by a portion of multiprocessor semiconductor chip that have at most one failing core 302 to the left of dividing line 500, irrespective of how many failing cores 302 are to the right of the dividing line. Every choice of "M" may require separate manufacturing and test flows. In one embodiment, only one choice of "M" may be made, equivalent to a "half good" chip to yield enough semiconductor chips available for early software development.

This "half good" chip can also be used by software, without any change in the hardware implementation described in FIGS. 1, 2, and 4-5 and without any change in the test flow of FIG. 3. If fails are detected during in-system operation, then control system software can decide to use the processor chips in a degraded mode (e.g., "half-good" chip), using the override bit 50 and the register 440 as necessary to spare out a newly found failed processor core, until actual physical repair or replacement can be done.

While designing the multiprocessor semiconductor chip, a simulation tool (e.g., Cadence® System development suite, etc.) verifies operations of all processor cores in the multiprocessor semiconductor chip by testing all possible physical-to-logical mappings of IDs of all the processor cores. For example, the override bit 50 and the register 440 shown in FIG. 5 can be used for verification. Both in the design phase verification and post-silicon (i.e. hardware) verification, the override bit 50 and the register 440 can be used to simulate any failed physical processor ID. The override bit 50 and the register 440 allows engineers or designers to exhaustively test the semiconductor chip to determine whether the semiconductor chip behaves identically, under all possible (or allowed) physical-to-logical mappings of IDs of processor cores.

Figure 7A:
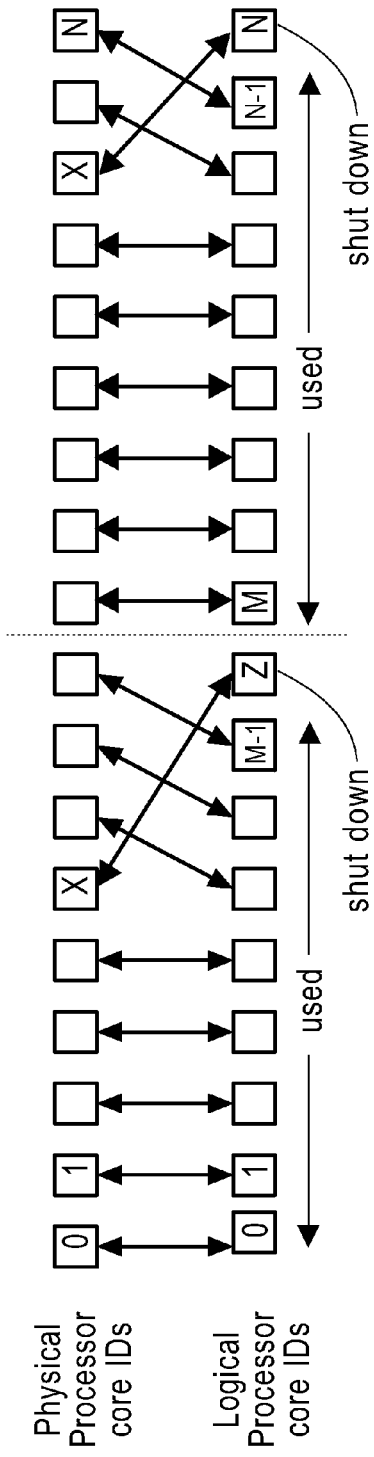
FIGS. 7A-7B illustrate exemplary physical-to-logical mappings of processor IDs in one embodiment.
Figure 7B:
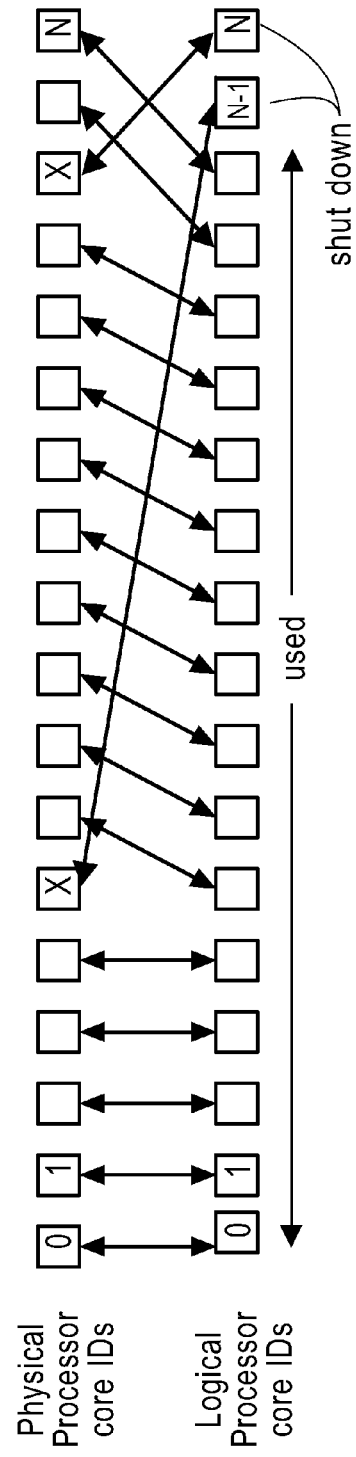

FIGS. 7A-7B illustrate two alternative extensions of the system and method in one embodiment, e.g., by implementing dual redundancies—i.e. where two of the physical processor cores are redundant processor cores, so that the multiprocessor semiconductor chip can allow two processor cores to fail. The scheme of FIG. 7A divides the multiprocessor semiconductor chip in two sections, with one redundant processor core for each section. Each section independently implements the previously described scheme of FIG. 4. FIG. 7B illustrates a scheme that applies the dual redundancy globally, i.e. across all processor cores on the semiconductor chip. The scheme shown in FIG. 7B is more flexible, and will generally result in better yield than the scheme of FIG. 7A, at the cost of more logic complexity in the on-chip logic.

Regarding FIG. 7B, assume that the failed processor cores have physical IDs F1 and F2, with $0 \leq F1 < F2 \leq N$.

Then the following mapping needs to occur:
The processor core with ID=F1 is mapped to logical ID=N−1.
The processor core with ID=F2 is mapped to logical ID=N.
For processor cores with physical ID<F1, logical ID=physical ID.
For processor cores with F1<physical ID<F2, logical ID=physical ID−1.
For processor cores with physical ID>F2, logical ID=physical ID−2.

Aspects of the present invention are described below with reference to flowchart illustrations and/or block diagrams of methods and apparatus (systems) according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A system for improving yield rate of a multiprocessor semiconductor chip that includes primary processor cores and one or more redundant processor cores, the system comprising:
a first tester conducting a first test on one or more processor cores in the multiprocessor semiconductor chip;
the first tester encoding results of the first test in an on-chip non-volatile memory device in the multiprocessor semiconductor chip;
a second tester conducting a second test on the one or more processor cores in the multiprocessor semiconductor chip;
the second tester encoding results of the second test in an external non-volatile storage device;
the second tester encoding an override bit in the external non-volatile storage device, in response to determining that at least one processor core in the multiprocessor semiconductor chip fails the second test;
a controller reading the override bit from the external non-volatile storage device;
a multiplexer selecting, in response to the read override bit, a physical-to-logical mapping of IDs (identifiers) of the primary processor cores and the redundant processor cores according to one of: the encoded results in the on-chip non-volatile memory device, or the encoded results in the external non-volatile storage device; and an on-chip logic configuring the primary processor cores and the redundant processor cores according to the selected physical-to-logical mapping of IDs.

2. The system according to claim 1, wherein all logical IDs of processor cores to run software are mapped to physical IDs of processor cores that have passed all the tests, while skipping any physical ID of any processor core that has failed the first test or second test.

3. The system according to claim 2, wherein a processor core that fails the first test or the second test is shut down.

4. The system according to claim 1, wherein the first tester updates the on-chip non-volatile memory device with a result of a further test whenever the first tester conducts the further test, and the second tester updates the external non-volatile storage device with a result of an additional test whenever the second tester conducts the additional test.

5. The system according to claim 2, wherein the software runs unchanged on the multiprocessor semiconductor chip regardless of whether the software is using the one or more redundant processor cores.

6. The system according to claim 1, wherein the one or more redundant processor cores are shut down if no processor core is failed in the first test or the second test.

7. The system according to claim 1, wherein the first test includes one or more of: a wafer test and a module test, and the second test includes one or more of: a card test and an in-system test.

8. The system according to claim 1, wherein the on-chip memory device includes eFuses (electronic fuses), and the external non-volatile storage device includes one or more of: an EPROM, an EEPROM and a Flash memory device.

9. The system according to claim 1, wherein the multiplexer selects the physical-to-logical mapping of IDs according to the encoded results in the on-chip non-volatile memory device if the read override bit is not set, and the multiplexer selects the physical-to-logical mapping of IDs according to the encoded results in the external non-volatile storage device if the read override bit is set.

10. The system according to claim 1, wherein the operations of all processor cores in the multiprocessor semiconductor chip are verified by testing all possible physical-to-logical mappings of IDs of the primary processor cores and the redundant processor cores.

11. The system according to claim 1, wherein the on-chip non-volatile memory device in the multiprocessor semiconductor chip includes a set of multiple registers, each register storing a different physical-to-logical mapping of IDs of the primary processor cores and the redundant processor cores.

12. The system according to claim 11, wherein the on-chip non-volatile memory device in the multiprocessor semiconductor chip further includes configuration bits that select one register among the multiple registers.

13. The system according to claim 1, wherein the selected physical-to-logical mapping of IDs uses a subset of all physical processor cores in the multiprocessor semiconductor chip.

14. A method for improving a yield rate of a multiprocessor semiconductor chip that includes primary processor cores and one or more redundant processor cores, the method comprising:
conducting a first test on one or more processor cores in the multiprocessor semiconductor chip;
encoding results of the first test in an on-chip non-volatile memory device in the multiprocessor semiconductor chip;
conducting a second test on the one or more processor cores in the multiprocessor semiconductor chip;
encoding results of the second test in an external non-volatile storage device;
encoding an override bit in the external non-volatile storage device, in response to determining that at least one processor core in the multiprocessor semiconductor chip fails the second test;
reading the override bit from the external storage device;
selecting, in response to the read override bit, a physical-to-logical mapping of IDs (identifiers) of the primary processor cores and the redundant processor cores according to one of: the encoded results in the on-chip non-volatile memory device, or the encoded results in the external non-volatile storage device; and
configuring the primary processor cores and the redundant processor cores according to the selected physical-to-logical mapping.

15. The method according to claim 14, wherein all logical IDs of processor cores to run software are mapped to physical IDs of processor cores that have passed all the tests, while skipping any physical ID of any processor core that has failed the first test or the second test.

16. The method according to claim 14, wherein a processor core that fails the first test or the second test is shut down.

17. The method according to claim 14, wherein the first tester updates the on-chip non-volatile memory device with a result of a further test whenever the first tester conducts the further test, and the second tester updates the external non-volatile storage device with a result of an additional test whenever the second tester conducts the additional test.

18. The method according to claim 15, wherein the software runs unchanged on the multiprocessor semiconductor chip regardless of whether the software is using the one or more redundant processor cores.

19. The method according to claim 15, wherein the one or more redundant processor cores are shut down if no processor core is failed in the first test or the second test.

20. The method according to claim 14, wherein the first test includes one or more of: a wafer test and a module test, and the second test includes one or more of: a card test and an in-system test.

21. The method according to claim 14, wherein the on-chip memory device includes eFuses (electronic fuses), and the external non-volatile storage device includes one or more of: an EPROM, an EEPROM and a Flash memory device.

22. The method according to claim 14, wherein the operations of all processor cores in the multiprocessor semiconductor chip are verified by testing all possible physical-to-logical mappings of IDs of the primary processor cores and the redundant processor cores.

23. The method according to claim 14, wherein the on-chip non-volatile memory device in the multiprocessor semiconductor chip includes a set of multiple registers, each register storing a different physical-to-logical mapping of IDs of the primary processor cores and the redundant processor cores.

24. The method according to claim 23, wherein the on-chip non-volatile memory device in the multiprocessor semiconductor chip further includes configuration bits that select one register among the multiple registers.

25. The method according to claim 14, wherein the selected physical-to-logical mapping of IDs uses a subset of all physical processor cores in the multiprocessor semiconductor chip.

* * * * *